N. THOMAS.
POWER TRANSMITTING DEVICE.
APPLICATION FILED APR. 8, 1916.
1,205,288.
Patented Nov. 21, 1916.
2 SHEETS—SHEET 1.
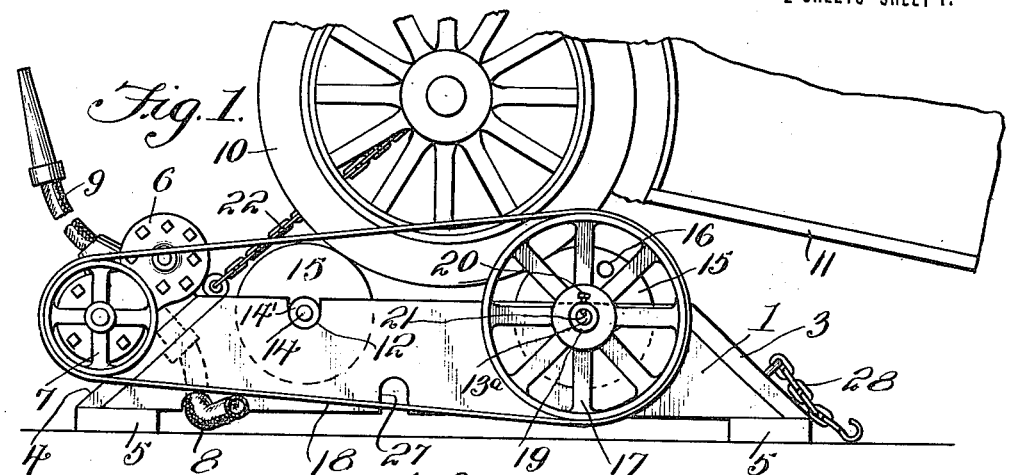
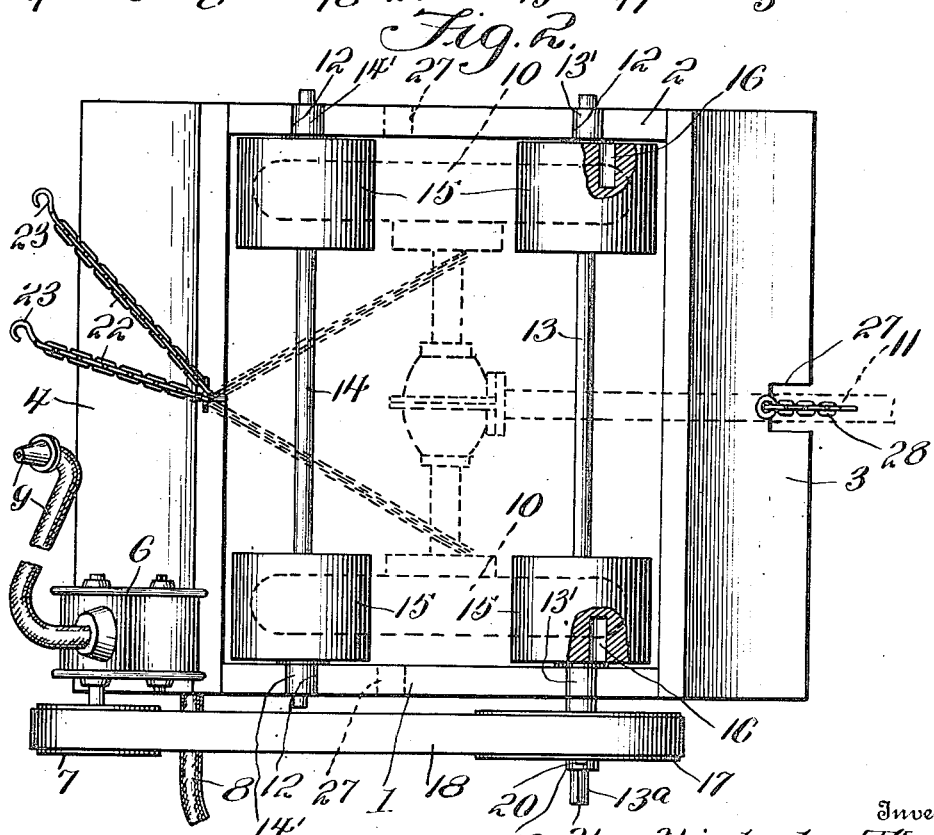
Witnesses
J. T. L. Wright
C. C. Hines
Inventor
Nicholas Thomas
By Victor J. Evans
Attorney

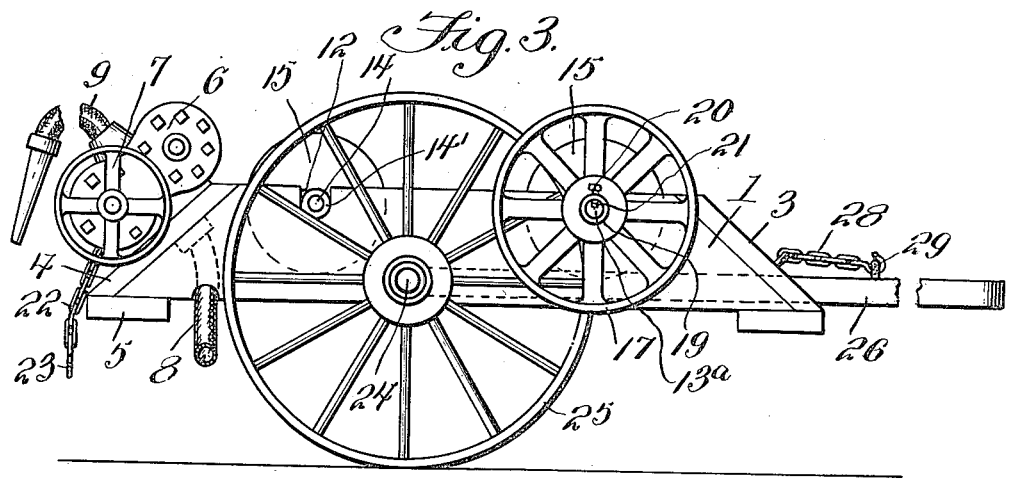
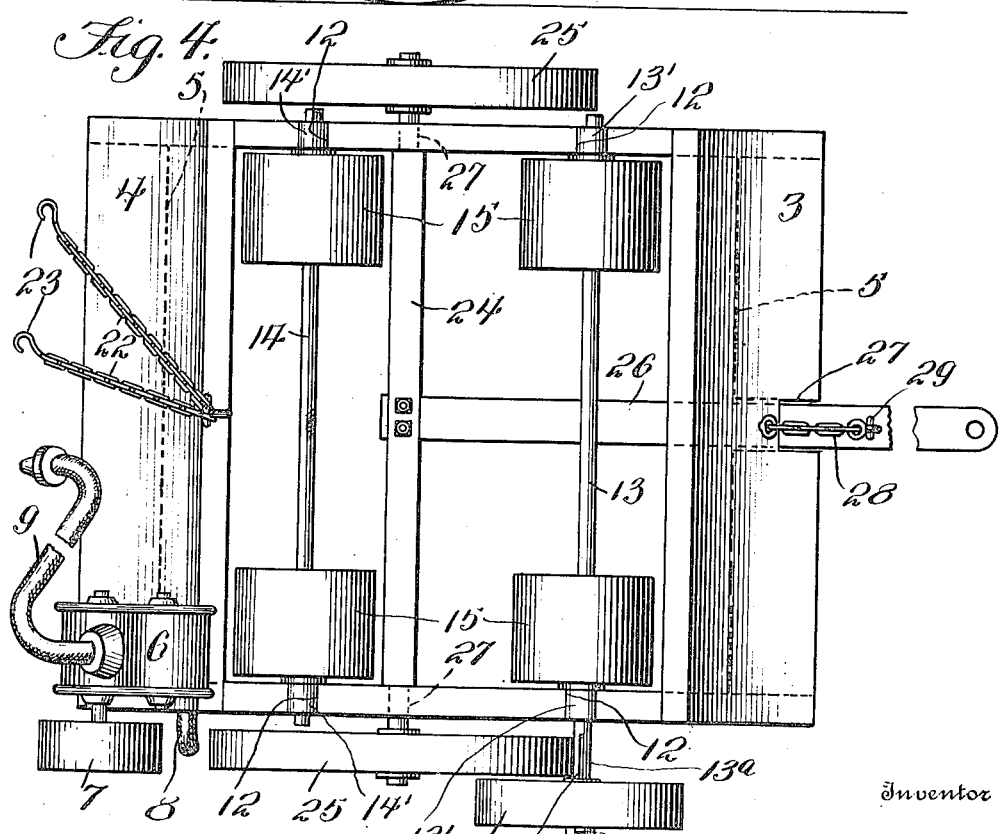

UNITED STATES PATENT OFFICE.

NICHOLAS THOMAS, OF BURLINGTON, WISCONSIN.

POWER-TRANSMITTING DEVICE.

1,205,288.

Specification of Letters Patent.   Patented Nov. 21, 1916.

Application filed April 6, 1916.   Serial No. 89,833.

*To all whom it may concern:*

Be it known that I, NICHOLAS THOMAS, a citizen of the United States, residing at Burlington, in the county of Racine and State of Wisconsin, have invented new and useful Improvements in Power-Transmitting Devices, of which the following is a specification.

This invention relates to a power transmitting device, preferably of the portable type, and adapted to be employed for transmitting power from the driving wheels of an automobile to any desired kind of machinery to be driven.

One object of the invention is to provide a device of the described character which may be employed to support an automobile and to receive power from the rear driving wheels thereof, for transmitting such power to and driving a fire hose pump, farm machinery or any other character of mechanism to be driven.

A further object of the invention is to provide a power transmitting device which may also be mounted upon a truck and attached to an automobile for conveyance thereby from point to point.

A still further object of the invention is to provide a device of the described character and which is so constructed and arranged as to be supported upon a light truck for transportation and conveniently fixed thereto, and which is readily convertible at will from a stationary to a portable transmitting device, and for driving a pump or other appliance mounted thereon for driving other machinery separate therefrom.

With these and other objects in view, the invention consists of the features of construction, combination and arrangement of parts hereinafter fully described and claimed, reference being had to the accompanying drawings in which:—

Figure 1 is a side elevation showing the device as arranged for receiving power from an automobile. Fig. 2 is a top plan view of the power transmitting device, showing in dotted lines the position of the driving wheels of the automobile when in operative relation. Fig. 3 is a side elevation of the device as it appears when mounted for conveyance from point to point. Fig. 4 is a top plan view of the same.

In carrying my invention into practice, I provide a power transmitting device comprising a frame structure, consisting of a pair of longitudinal side bars 1 and 2, connected at the ends thereof by cross pieces forming inclined end portions or platforms 3 and 4, thus providing an open oblong rectangular frame having the inclined surfaces 3 and 4 at the ends thereof. Transverse sill pieces 5 are also preferably provided at the ends of the frame to support the same at a desired elevation above the surface of the ground when in use, and to give additional strength and rigidity to the structure.

The inclined platform 4 may be employed to support any suitable apparatus or piece of machinery which may be mounted upon the machine to be driven. In the present instance I have shown mounted thereon a rotary water pump 6, the shaft of which is provided at one end with a drive pulley 7, and which pump is also provided with suction and discharge pipes or hose 8 and 9. The device thus may be employed for use as a fire extinguishing apparatus and for other like purposes capable of being drawn to the scene of the fire or to a desired point of use, as hereinafter described. The other end platform 4 is designed for use as an inclined approach, by means of which the rear driving wheels 10 of an automobile 11 may be brought into and out of operative position by backing the machine up said platform and driving them down after use.

Journaled upon the frame in open bearing recesses 12, formed in the upper edges of the side bars 1 and 2, are front and rear transverse shafts 13 and 14, which turn in contact with roller bearings 13' and 14' disposed within said bearing recesses. Fixed to each of the shafts is a pair of friction drums or wheels 15, arranged near the ends of the shafts, the said drums of the shafts being in alinement with each other. These drums or wheels are arranged the same transverse distance apart as the rear wheels 10 of the automobile and the front and rear wheels 15 at the opposite sides of the frame are also longitudinally spaced so that the wheels 10 may rest upon and span the same, as shown in dotted lines in Fig. 2. By this means the wheels of the automobile may be brought into direct driving engagement with the wheels 15 and so as to be supported by the wheels of both shafts 13 and 14 and to transmit driving motion to the shaft 13. The construction described allows the shafts 13 and 14, with the drums or wheels 15, to be readily and conveniently applied to and removed from the bearing recesses. Each of the drums or wheels 15 of the forward axle 13 is provided with a pair of sockets or openings 16 and 16', said openings being adapted to receive pins 16ª and 16ᵇ. The pins 16ª when applied rest upon the bars 1 and 2 and prevent the wheels 15 from turning under the tendency of the automobile to run off and down the inclined plane 3, and upon removing these pins the drums 15 will be turned by the weight of the automobile in moving forward and will continue to turn until the pins 16ᵇ contact with the bars 1 and 2, at which time the wheels 10 will have run off the forward drums 15 down the inclined plane 3, thus providing for the automatic displacement of the automobile when its use is not required. The holes also serve to receive a crow bar or other similar implement whereby the proper positioning of the wheels 10 may be facilitated and the drums 15 turned to start the wheels 10 forward to run off the automobile in the event that the latter should bind or hang from any cause.

In practice either one or both shafts 13 and 14 may be provided with means for transmitting power. In the present instance I have shown one end of the shaft 13 extended and provided with a driving pulley 17 which may be connected by a belt 18 with the pulley 7 for driving the pump or other apparatus mounted on the inclined platform 3, or this belt may be employed for driving other machinery not mounted upon the frame of the device. The wheel 17 is provided with a hub 19 which is fitted to slide upon the extended end 13ª of the axle 13, and which is provided with a set screw or other suitable locking device 20 to engage a groove 21 in the shaft, by means of which the pulley may be adjusted inwardly and outwardly with relation the side bar 1, for a purpose hereinafter described.

It will of course be understood that the device may be employed as a stationary power transmitting device, in which case it will be rested by its transverse supporting members 5 upon the ground, a floor or any other suitable foundation, so that in use an automobile may be backed up in position as shown in Fig. 1 for transmitting driving power. In such position of the apparatus the weight of the device will hold it against shifting movement under the vibration of the working parts, but for the purpose of maintaining the automobile in fixed position anchor chains 22 or the like may be attached at one end to the platform 3 and provided with hooks 23 at their free ends to engage the rear axle or other suitable part of the automobile 11, by means of which displacement of the wheels 10 thereof will be prevented.

For convenience in adapting the device for use as a fire engine, and for use also as a transportable power transmission device, I provide a suitable transportation truck and means for connecting the power transmitting device thereto. This truck comprises a stationary axle 24 having a pair of carrying wheels 25 journaled thereon and provided with a draft tongue 26, which tongue may be fastened to an automobile or other vehicle, so that the truck with the power transmitting device mounted thereon may be conveniently transported from place to place.

For the purpose of securing the device in position upon the truck, the side bars 1 and 2 are formed in their lower edges with notches or recesses 27 to receive and engage the axle 24 inside of the wheels 25, while the platform 4 and cross piece 5 are formed with cut away portions 28 to receive, accommodate and provide for the passage of the tongue 26, and adapt said tongue to be held in position against relative displacement. Also for the purpose of securing the device firmly and securely in position, fastening chains 28 may be provided upon the platform 4 and include hooks to engage eyes 9 upon the tongue, by means of which the parts referred to may be positively connected. Hence it will be seen that the device may be mounted upon a truck and drawn by hand, by draft animals or by means of an automobile from place to place, thus adapting the device to be employed as a fire engine and as a power plant for driving various kinds of farm and other machinery. When the frame is mounted upon the truck the pulley 17 is adjusted outwardly on the shaft extension 13ª to accommodate the adjacent wheel of the truck and permit the same to turn in the space between said pulley and the adjacent side bar 1.

It will be seen from the foregoing description that the invention provides a device of the character described which is not only simple of construction and inexpensive of production, but is effectually adapted for the stated purposes.

I claim:—

1. A power transmitting device comprising a frame embodying means for detachably mounting the same upon a carrying truck, said frame including an inclined end approach, transverse shafts mounted upon the frame and provided with friction wheels to support and receive driving motion from the driving wheels of an automobile, a driving pulley upon one side of said shafts, means for anchoring an automobile to the device, and means for attaching the frame to a tongue of the truck, said inclined approach being provided with an opening to receive and accommodate said tongue.

2. A power transmitting device comprising a frame formed of side bars connected by end pieces, one at least of said end pieces forming an inclined plane, said side bars being provided with notches in their lower edges for engagement with the wheeled axle of a carrying truck, transverse shafts mounted upon the frame and provided with friction wheels to support and receive driving motion from the driving wheels of an automobile, a driving pulley adjustable longitudinally upon one of said shafts and provided with means for fixing it thereto, said pulley being arranged upon an extension of the shaft outside the frame, means for anchoring an automobile to the device, and means for attaching the frame to a tongue of the truck, said inclined approach being provided with an opening to receive and accommodate said tongue.

3. A power transmitting device comprising a frame formed of side bars connected by end pieces, one at least of said end pieces forming an inclined approach, said side bars being provided with notches in their lower edges for engagement with the wheeled axle of a carrying truck, transverse shafts mounted upon the frame and provided with friction wheels to support and receive driving motion from the driving wheels of an automobile, means for transmitting motion from said friction wheels, means for anchoring an automobile to the device, and means for attaching the frame to a tongue of the truck, said inclined approach being provided with an opening to receive and accommodate said tongue.

In testimony whereof I affix my signature in presence of two witnesses.

NICHOLAS THOMAS.

Witnesses:
A. L. THOMAS,
THEODORE WISMIFOKI.